(12) United States Patent
Teng et al.

(10) Patent No.: US 8,521,539 B1
(45) Date of Patent: Aug. 27, 2013

(54) METHOD FOR CHINESE POINT-OF-INTEREST SEARCH

(75) Inventors: Jianzhong Teng, Shanghai (CN); Yaxin Zhang, Shanghai (CN)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/429,877

(22) Filed: Mar. 26, 2012

(51) Int. Cl.
*G10L 21/00* (2006.01)

(52) U.S. Cl.
USPC ........ 704/275; 704/240; 704/270.1; 704/251; 704/257; 704/9; 701/420; 701/427; 701/418

(58) Field of Classification Search
USPC .............. 704/275, 270.1, 236, 240, 251, 270, 704/9, 252, 235, 257, 10; 379/88.01, 88.17; 340/989; 701/533, 427, 400, 418, 420; 707/999.003
See application file for complete search history.

(56) References Cited

U.S. PATENT DOCUMENTS

| | | | | |
|---|---|---|---|---|
| 6,240,347 B1 * | 5/2001 | Everhart et al. | ................. | 701/36 |
| 6,985,865 B1 * | 1/2006 | Packingham et al. | ......... | 704/275 |
| 7,310,602 B2 * | 12/2007 | Takaichi et al. | ............... | 704/252 |
| 7,313,525 B1 * | 12/2007 | Packingham et al. | ......... | 704/270 |
| 7,373,248 B2 * | 5/2008 | Schalk | .......................... | 701/427 |
| 7,634,357 B2 * | 12/2009 | Schalk | .......................... | 701/420 |
| 8,239,129 B2 * | 8/2012 | Shen et al. | ..................... | 701/400 |
| 8,279,171 B2 * | 10/2012 | Hirai et al. | ..................... | 345/156 |
| 8,352,260 B2 * | 1/2013 | Sung | ............................. | 704/231 |
| 2008/0177541 A1 * | 7/2008 | Satomura | ...................... | 704/251 |
| 2008/0177551 A1 * | 7/2008 | Schalk | .......................... | 704/275 |
| 2011/0022292 A1 * | 1/2011 | Shen et al. | ..................... | 701/200 |
| 2011/0161080 A1 * | 6/2011 | Ballinger et al. | ............. | 704/235 |

* cited by examiner

*Primary Examiner* — Vijay B Chawan
(74) *Attorney, Agent, or Firm* — Chapin IP Law, LLC

(57) ABSTRACT

Techniques disclosed herein include systems and methods of automated speech recognition (ASR) for voice destination entry (VDE) include open voice searching (natural language searching) of destinations. A first part uses a server-based automated speech recognizer. The second part is client-based automatic speech recognition (ASR) processing. Thus, techniques include a hybrid VDE solution that provides users with an accurate and flexible way to use speech recognition technologies. A server-based speech recognizer executes the open-search task, while a client-based recognizer refines the results from the server to deliver an optimized result. This system and method significantly improves recognition accuracy for dictation engine based POI search of Chinese Mandarin input and input from other languages. Moreover, the methods herein largely improve the user experience by allowing users to say a partial POI name, and abbreviation, or even say a POI name in a reversed word order.

20 Claims, 6 Drawing Sheets

METHOD FOR CHINESE POINT-OF-INTEREST SEARCH

BACKGROUND

This disclosure relates to open voice search including open voice search for geographical navigation.

Voice control of various applications and tasks can provide convenience and safety, especially in automotive applications. Automotive navigation systems, such as satellite-based navigation or Global Positioning System (GPS) navigation are increasingly common. For a given destination, drivers typically input either a street address (street name, number, city, etc.) or input a point-of-interest (POI) name. A point-of-interest is typically a specific geographic location that is of interest to a user. For example, points-of-interest can include gas stations, restaurants, malls, company names, apartment building names, businesses, monuments, landmarks, and so forth. Thus, a point-of-interest can be essentially a name for a location in which the name references a specific address. As such, users can simply remember names of locations instead of addresses of locations. POI searching is a popular feature in the automotive environment.

In some countries, point-of-interest destination searching is more popular than street address input. For example, drivers in China generally prefer inputting a point-of-interest name to navigate to a particular location. Typically, shops or buildings include some type of landmark, which may be included in a POI search. Voice-enabled point-of-interest search is one of the most popular applications in satellite navigation. This is also known as Voice Destination Entry (VDE). Such voice-enabled POI searching, however, typically has very low recognition accuracy, which can be frustrating to speakers. Accordingly, what is needed is a technique for improved accuracy of point-of-interest searching.

SUMMARY

Voice Destination Entry (VDE) is an automated speech recognition (ASR) application that is in high demand, especially in the automotive domain. Satellite-based navigation systems typically include point-of-interest names or addresses supplied by a map company. These POIs are typically recalled using a full name of a given POI, which can be lengthy. For example, POIs that are provided in Chinese Mandarin often include more than ten Chinese characters. Most users of car navigation in China, however, cannot always exactly remember a full POI name. Instead, such users often speak a memorized or shortened version of the name instead of the full POI name. It is common then for users to only remember a few of the Chinese characters or words for a given POI entry. It is also common for some users to input or speak an abbreviation instead of a full POI name. Such incomplete POI input makes speech input recognition, processing and search a difficult task for car navigation systems, smart phones, and other devices.

One technique to address this is to manually search for a given POI by subject, but this does not provide a preferred solution for open-voice search because users would need to manually interact with a graphical user interface of the navigation system.

Conventional open-voice POI search has a relatively low accuracy, such as around 60% accuracy in some instances. Such low accuracy might return search results having tens of pages of results, none of which may contain the target location.

Conventional techniques include using grammar-based automatic speech recognition. One solution accesses all POI data from a map source or map provider, and compiles a grammar representative of the POI data. Then a local speech recognizer (executing on a mobile device or vehicle) converts a spoken utterance into text. With this technique, users must enter or speak a full name of a POI. Such a requirement can be problematic. Normally, one Chinese Mandarin word consists of two or three characters. A local recognizer can segment the word and compile each word in the grammar and do a partial recognition, but this solution is not flexible enough to yield an acceptable level of error. A related problem is that embedded hardware platforms or processors on a client device typically do not have the system resources for accurate automated speech recognition of natural language or open voice input. This POI database can be extremely large, such as several hundred thousand entries per city. With such large amounts of data it is difficult for portable devices to perform voice search on such a large amount of POI entries.

Another solution is to use a cloud-based speech recognizer and map data. Given the huge number of POIs and constrained system resources in client or mobile devices, a server-based approach can be helpful. But such a solution usually does not provide flexibility for POI name input. For example, speakers usually remember a couple of characters or words from a given POI, but when uttering a POI search, it is common for users to speak the POI name in reverse word order or otherwise out-of-order. Speaking characters or words of a given POI out-of-order is a significant problem for conventional statistical recognizers. Moreover, some users speak an abbreviation of a given POI, which also brings significant recognition challenges. Another issue with a server-based approach can be attributed to a mismatched language model constraint of POI data, and the multiple graphic representations of Chinese sound. For example, on average, each Chinese non-tone syllable represents more than 60 Chinese characters, while a given tonal syllable can represent more than 26 Chinese characters. More specifically, the following four POI names (1) 老夜市, (2) 老爷寺, (3) 劳业室, and (4) 牢叶市, all have the same pronunciation of "Lao Ye Shi" (disregarding tone). From a speech recognition viewpoint, the recognized result (the sound) is correct, but the POI name is wrong.

Techniques disclosed herein provide a flexible POI open-voice search method. This approach includes two parts. The first part uses a cloud-based recognizer, such as an automated speech recognizer executing on a server or server cluster. The second part is client-based automated speech recognition and processing. Thus, techniques include a hybrid VDE solution that provides users with an accurate and flexible way to use speech recognition technologies. This system and method significantly improves recognition accuracy for dictation engine based POI search of Chinese Mandarin input (improvement of around 80% error reduction). Moreover, the methods herein largely improve the user experience by allowing users to speak a partial POI name, an abbreviation, or even speak a POI name in a reversed word order.

One embodiment includes a speech recognition manager that executes a voice destination entry process or system. The speech recognition manager transmits a spoken query to a server computer. The spoken query or utterance is recorded via a client device. The spoken query is recorded as input of a geographical navigation system, such as a voice-controlled automotive GPS. The geographical navigation system includes a geographical navigation database that maintains point-of-interest locations. The speech recognition manager receives, from the server computer, one or more speech recognition hypotheses of the spoken query. The one or more speech recognition hypotheses are generated by a first automated speech recognition process executing at the server computer. This server-based ASR process analyzes the spoken query as a Chinese language spoken utterance, such as Chinese Mandarin.

The speech recognition manager executes a second automated speech recognition process on the spoken query based on the multiple speech recognition hypotheses received. The speech recognition manager updates the multiple speech recognition hypotheses based on speech recognition results from the second automated speech recognition process. This second ASR process can be executed at the client level, such as with a satellite navigation system located within a vehicle. The speech recognition manager converts the multiple speech recognition hypotheses to respective Pinyin strings, and then searches the geographical navigation database with each respective Pinyin string using a fuzzy matching process. The fuzzy matching process identifies a list of N-best point-of-interest results that correspond to the Pinyin strings. In response to presenting the list of N-best point-of-interest results as selectable points-of-interest via a user interface, the speech recognition manager receives input via the user interface (user confirmation) that selects a given point-of-interest from the presented list of N-best point-of-interest results. The geographical navigation system can then continue with calculating a route giving directions for travel.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: transmitting a spoken query to a server computer, the spoken query recorded via a client device, the spoken query recorded as input of a geographical navigation system, the geographical navigation system including a geographical navigation database that maintains point-of-interest locations; receiving, from the server computer, multiple speech recognition hypotheses of the spoken query, the multiple speech recognition hypotheses generated by a first automated speech recognition process that analyzed the spoken query as a Chinese language spoken utterance; executing a second automated speech recognition process on the spoken query based on the multiple speech recognition hypotheses received; updating the multiple speech recognition hypotheses based on speech recognition results from the second multiple speech recognition process; converting the multiple speech recognition hypotheses to respective Pinyin strings; searching the geographical navigation database with each respective Pinyin string using a fuzzy matching process, the fuzzy matching processing identifying a list of N-best point-of-interest results that correspond to the Pinyin strings; and in response to presenting the list of N-best point-of-interest results as selectable points-of-interest via a user interface, receiving input via the user interface that selects a given point-of-interest from the presented list of N-best point-of-interest results. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting voice destination entry for automotive systems and mobile phones. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
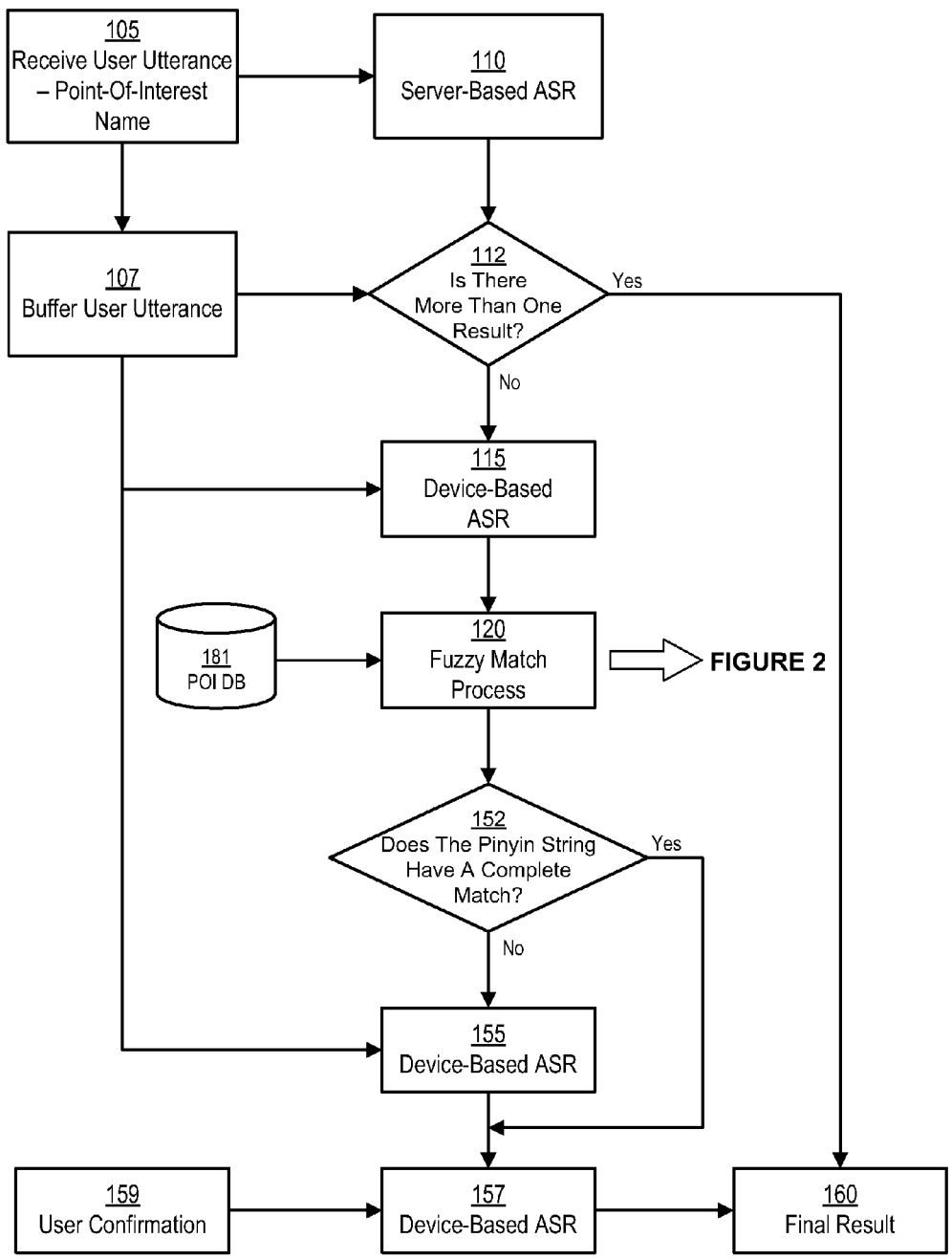
FIG. 1 is a flowchart illustrating an example of a process supporting open voice destination entry and recognition according to embodiments herein.

Techniques disclosed herein include systems and methods of automated speech recognition that support voice destination entry (VDE) including open voice searching. Techniques disclosed herein provide a flexible point-of-interest (POI) open-voice search method. This approach includes two parts. The first part uses a cloud-based recognizer, such as an automated speech recognizer executing on a server or server cluster. The second part is client-based ASR and processing. Thus, techniques include a hybrid VDE solution that provides users with an accurate and flexible way to use speech recognition technologies. A server-based speech recognizer executes the open-search task, while a client-based recognizer refines the results from the server to deliver an optimized result. This system and method significantly improve recognition accuracy for dictation engine based POI search of Chinese Mandarin input and input from other languages. Moreover, the methods herein largely improve the user experience by allowing users to say a partial POI name, and abbreviation, or even say a POI name in a reversed word order.

While techniques can be viewed for convenience as a two-part system, the system can include several process steps as part of a multi-stage matching method that improves recognition accuracy. First, a speech query (a POI name uttered by a user) is sent to a server for automated speech recognition. The speech query can be buffered or stored for subsequent use at the client device. A dictation engine at the server identifies and returns N-best results. A local speech recognizer (client-based recognizer) conducts recognition with the buffered speech utterance and a dynamic grammar compiled from the N-best results of the dictation engine. The system can choose the best-match result from the N-best list on a purely acoustic evaluation and disregard any impact of a language model constraint. The recognition result can then be used in the next stage.

The speech recognition manager then uses a fuzzy-matching module to find the best matching POI candidates from POI database in Pinyin form. Such a technique can be beneficial to help avoid missing POIs having a same pronunciation but different characters. Note, however, that many users may say a POI name in its short name. To address this, the Pinyin matching algorithm can select all POIs that are supersets of the syllables of the recognition result. For example, "交通大学 附属中学" (Tong Xue Shu Xue) combined with "交大附中" (Jiao Da Fu Zhong) becomes "Jiao Tong Da Xue Fu Shu Zhong Xue." The fuzzy-matching module also takes care of cases of reversed word order because people often say a POI name with reversed word order. For example, a given POI name is 百联西郊 (Bai Lian Xi Jiao) but a user may say 西郊百联 (Xi Jiao Bai Lian). To further reduce misrecognitions, the system can also consider POIs with similar pronunciations to the recognition results from the dictation engine. Similar pronunciation candidates can be retrieved from a phonetic confusion table, by searching for valid POIs from them. These extra candidates, together with the initial candidates, can then be compiled into a grammar for subsequent automated speech recognition. The local speech recognizer can be used again to search the final recognition results with the compiled grammar. A modified list of N-best results can then be presented for user selection. Such a hybrid speech recognition technique can increase POI recognition accuracy from about 64% to about 94%. Compared with conventional grammar-based POI recognition, the speech recognition manager disclosed herein significantly enhances the usability of a VDE by allowing users say POIs in a more flexible way, such as short names, abbreviations, reversed word order etc.

Referring now to FIG. 1, a block diagram illustrates an example VDE speech recognition process. In step 105, a client device receives/records a user utterance. This user utterance can represent a point-of-interest name. For example, a user utters "东方明珠" (Dong Fang Ming Zhu). This utterance is transmitted to the server, such as via wireless communication or telecommunication technologies. In step 110, the server executes automated speech recognition. Such ASR can be based on hot words, key words, or syntactically meaningful phrases. Points-of-interest, however, typically consist of one or more location, brand, business, branch, names, etc., which are not always syntactically meaningful. Because of the lack of syntactic meaning, such search results can have a low accuracy (around 64% accuracy). For example, 老夜市, 老爷寺, 劳业室, 牢叶市, all have the same pronunciation (Pinyin) "Lao Ye Shi." Due to strong language model constraints the example query 东吴苑 becomes 动物园 (Dong Wu Yuan) as the later more frequently appears in people's queries. Also, too many Chinese characters share the same Pinyin. On average, one non-tonal syllable is shared by more than 60 characters and one tonal syllable points to more than 24 characters.

In step 110, the server returns a list of N-best results. In step 112, if there is only one result returned, then this only result can be used as a final result for POI selection. This can mean that a confidence measure is sufficiently high to output only one result. If there are multiple N-best results, then the process continues to step 115. An example N-best list might include:

洞房名著 (Dong Fang Ming Zhu)
董芳冥猪 (Dong Fang Ming Zhu)
冬防鸣驻 (Dong Fang Ming Zhu)
董藩明主 (Dong Fan Min Zu)
东方民族 (Dong Fang Min Zu)
. . .

In step 115, speech recognition manager executes an ASR process that can include compiling a dynamic grammar with the above N-best list of results. The client-based ASR module then executes a recognition process using the dynamic grammar and buffered speech utterance. In one example, the client-based ASR selects 洞房名著 (Dong Fang Ming Zhu) as the result. This recognition step can be useful to correct any possible error resulting from the strong language model constraint.

Figure 2:
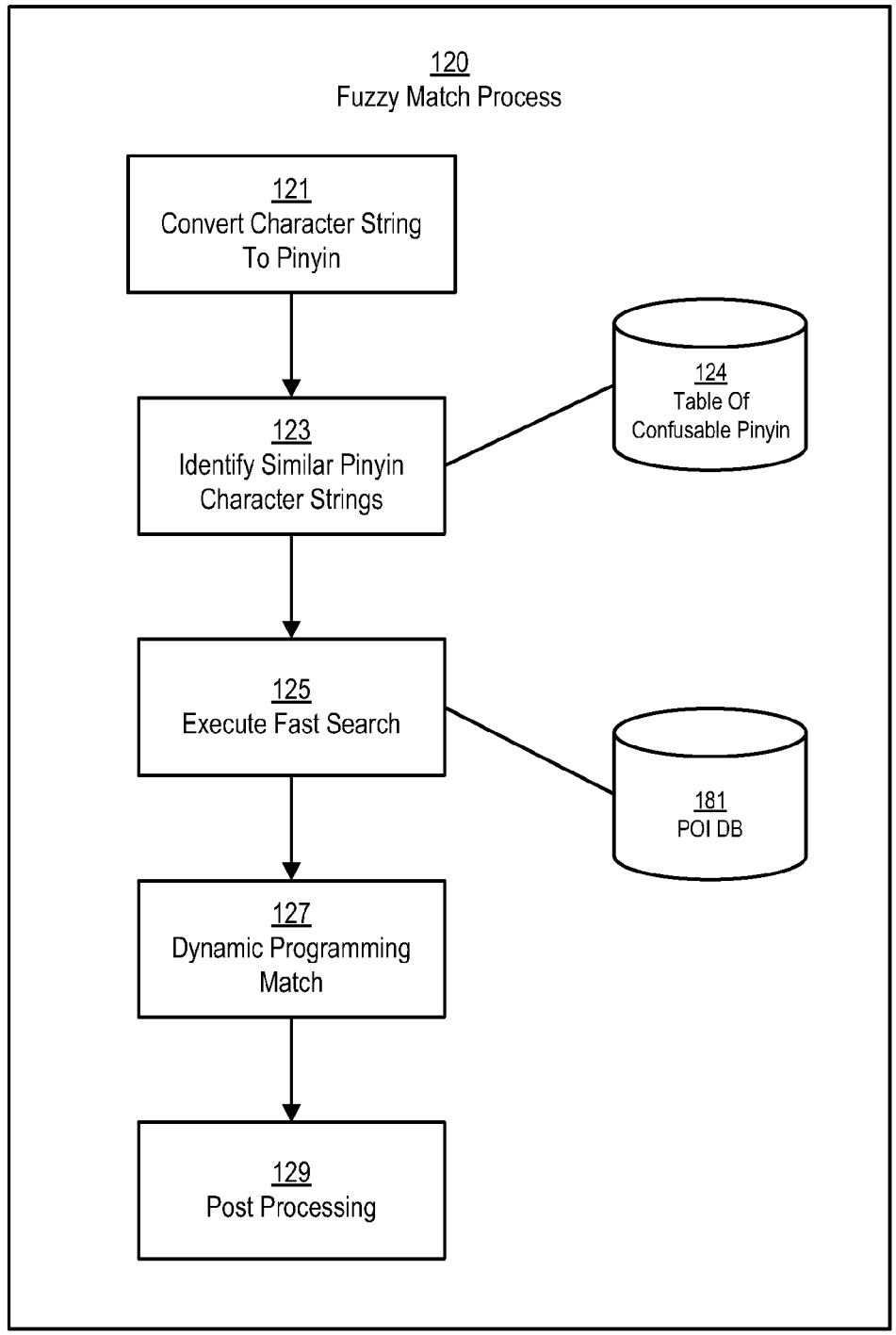
FIG. 2 is a flowchart illustrating an example of a fuzzy matching process supporting open voice destination entry and recognition according to embodiments herein.

The speech recognition manager then converts the result to a Pinyin string and uses the Pinyin string in a fuzzy matching process 120 using updated results. FIG. 2 shows steps that can be included in the fuzzy matching process, and will be described below. The fuzzy match module searches POI database 181 with the Pinyin string, and returns the N-best results. The Pinyin string can be expanded. A table of similar Pinyin can be derived from Matcher phonetic matrices. For example, Dong can expand to include Tong and Kong; Fang can expand to include Fan, Feng, Sang, and Shang; Ming can expand to include Min, Meng, Xing, and Qing; and Zhu can expand to include Zu, Zhou, Chu, and Shu. Below is an example expanded list of fuzzy match results with corresponding scores:

东方明珠塔 (Dong Fang Ming Zhu Ta)—4
东方明珠 地下停车场 (Dong Fang Ming Zhu Di Xia Ting Che Chang)—4
东方明珠售票处 (Dong Fang Ming Zhu Shou Piao Chu)—4
上海东方 明珠有限公司 (Shang Hai Dong Fang Ming Zhu You Xian Gong Si)—4
东方民族 歌舞团 (Dong Fang Min Zu Ge Wu Tuan)—4
浦东成方圆 民族 中学 (Pu Dong Cheng Fang Yuan Min Zu Zhong Xue)—4
民主大楼东 方物业公司 (Min Zhu Da Lou Dong Fang Wu Ye Gong Si)—4
朱明芳汽车 修理浦东店 (Zhu Ming Fang Qi Che Xiu Li Pu Dong Dian)—4
浦东鸣祝加油站 (Pu Dong Zhu Ming Jia You Zhan)—3
方泾路诸城 路民生银行 (Fang Jing Lu Zhu Cheng Lu Min Sheng Yin Hang)—3
东方广场 (Dong Fang Guang Chang)—2
. . .

Note that some Pinyin syllables in this example list are in reversed order. The score listed at the end of each result represents a matching score. If a given Pinyin string does not have a complete match (152), then device-based ASR can be executed again (155). If the number of results return by the fuzzy matching process is too large (such as more than five results), then the device ASR can choose better results. Candidates with a high matching score can be compiled into the device-based ASR grammar, and the ASR can select better results. After an addition ASR evaluation (155) using the device-based ASR and buffered speech utterance, the updated N-best list can include:

东方明珠塔 (Dong Fang Ming Zhu Ta)
东方明珠地 下停车场 (Dong Fang Ming Zhu Di Xia Ting Che Chang)
东方明珠售票处 (Dong Fang Ming Zhu Shou Piao Chu)
上海东方明 珠有限公司 (Shang Hai Dong Fang Ming Zhu You Xian Gong Si)
民主大 楼东方物业公司 (Min Zhu Da Lou Dong Fang Wu Ye Gong Si)

At this point accuracy can be increased to around 94% or more. This refined N-best list can then be presented to a user for confirmation (159), such as either by manual selection or voice input selection. After receiving user confirmation of a given presented POI selection, the system can use this selection as a final result (160) and navigate to a corresponding geographical location.

Referring to FIG. 2, the fuzzy matching process is shown in more detail. In general, the input to the fuzzy matching module is a Chinese character string, and the output is an N-best Chinese character strings.

In step 121, the speech recognition manager converts Chinese character strings to Pinyin. Pinyin is the official system to transcribe Chinese characters into Latin script in China and several other countries. Pinyin is also used as an input method to enter Chinese characters into devices. On average one non-tone Pinyin syllable maps to more than 60 Chinese characters, and one tonal Pinyin syllable maps to more than 24 Chinese characters. In other words, many Chinese characters have the same pronunciation, which means the result returned by the server-based ASR may have the correct Pinyin but the wrong characters. For example, 老夜市 老爷寺 劳业室, and 牟叶市 all have the same pronunciation "Lao Ye Shi."

In step 123, the speech recognition manager identifies similar Pinyin character strings. Some Pinyin syllables are quite similar to each other. This means that misrecognized results returned by the server ASR can have similar Pinyin syllables due to a close acoustic score and higher language score, while the correct results are not included in the N-best list. To avoid such misrecognitions, the speech recognition manager expands the results to the similar Pinyin syllables. Based on a given accent, users can also define or customize a table of similar syllables. For example, confusing syllable pairs can include: chong-cong; chou-cou; chu-cu; chuai-cuai; and chuan-cuan. Continuing with this example, the speech recognition manager can expand an input string of Chong\Zhong Qing Huo Guo by referencing table 124 to be expanded as Chong|Cong\Zhong|Zong Qing Huo Guo (the "searched string").

In step 125, the speech recognition manager executes a fast search. The fast search can be considered as a hash-search. "Fast search" can comprise an algorithm that roughly excludes POI entries that are not likely said by user. Fast search can include a kind of hash-search that does not cost a lot in CPU resources relative to dynamic programming process. Memory can be saved by reading only those lines needed from the POI file. Before the fast search, the speech recognition manager can make an index for each Chinese non-tone syllable of the whole POI DB, which can be completed offline. Here is an example of POI database consisting of four POIs:

Line 1: 海门镇|源东 社区|卫生站|
Line 2: 天地岛川|停 车|设备制造公司
Line 3: 和济药房|
Line 4: 上海|电信|百 事应|信息公司|

The Chinese characters can then be converted to Pinyin:
Line 1: hai men zhen yuan dong she qu wei sheng zhan
Line 2: tian dilde dao chuan ting chelju she bei zhi zao gong si
Line 3: he|huo|hu ji yao fang
Line 4: shang hai dian xin bai shi ying xin xi gong si The backslash used here indicates multiple pronunciations of a Chinese character. For example, Line 3 he\huo\hu means the Chinese character "和" has 3 pronunciations: "he", "huo", and "hu." The system can index all pronunciations by making a Pinyin index file for POIs. It indexes each syllable with the line number of a particular POI that contains the corresponding syllable.

The speech recognition manager can search the Pinyin strings and get a score for each line representing a number of instances in POIs within database 181. Scores can be accumulated in a score table. The table can indicate how many syllables of a search string are found in each POI or POI line. Candidates having a low score can be eliminated. During the fast search, if the score of a line is too low, it will be dropped. A useful rule can be that an acceptable score should be equal to or larger than the half of syllable numbers of input POI name. For example, if the number of the input POI has five characters (syllables), then the score should be equal to or larger than three. To save memory and CPU resources, the speech recognition manager can begin the search from the Pinyin syllable having the lowest frequency. Many low score lines can be dropped as early as possible by this method.

Some high-frequent syllables can be ignored. Some common words appear in many POIs. These words provide little information, but still contribute to the score. When we do the fast search, these words can optionally be ignored. For example, in Shanghai POI DB, the syllables "Shang Hai" exist in many POIs, and thus the system can ignore the Pinyin "Shang Hai" when calculating a score. The results of the fast search can include a list of POIs, identified by line or otherwise, and corresponding scores. A subset of POIs having the best scores can be selected as results of the fast search.

In step 127, the speech recognition manager executes a dynamic programming match. This step compares the searched string and the N-best line from the fast search results and can match out-of-order utterances with correct order from a POI name. An improved-Levenshtein distance or string metric can be used for measuring the amount of difference between two sequences. Before comparing the similarity between two sentences, the speech recognition manager can first define the similarity between two Pinyin strings. Similarity and corresponding scores can be based on having same syllables (Chong vs Chong), similar syllables (Chong vs Cong), same initials (La vs Luo), same word stem (Puo vs Luo), initial letter similarity (Chang v. Cuo), word stem similarity (Lan vs Pang), whether words are English or a number. Sentences include characters or syllables. An example characters sentence is 重庆火锅, while an example Pinyin sentence is "Chonglzhong Qing Huo Guo," having four syllables/words. A word similarity is calculated, which can be modified such as after considering information of continuous words, and how long a continuous string is possible. A sentences similarity algorithm can support partial name POI search, as a partial name can get a relatively high score from the POI database.

The speech recognition manager can account for other sentence similarities including reversed words, abbreviations, and synonyms. Regarding reversed words, sometimes people may say a POI name with reversed words order. For example, a user may speak either 纽昂司上海 (Nuance Shanghai) or 上海纽昂司 (Shanghai Nuance). The system can assume that the reversed words at least contain two Chinese Characters (reasonable for the most cases). Vector flags for a string should be true when the current character is matched and the last character is matched, too. For example, the N-best line result from the fast search is 上海纽昂司软件技术有限公司 (Shanghai Nuance Software tech co ltd), Pinyin: Shang Hai Niu Ang Si Ruan Jian Ji Su You Xian Gong Si, while the searched string is 纽昂司上海 (Nuance Shanghai), Pinyin: Niu Ang Si Shang Hai. The initial flags for the fast search results are [false, false, false, false, false], but after dynamic programming match, the flags would be [false, true, true, false, true]. Accordingly if two continuous "false" indications are found, then the string can be deemed not reversed, otherwise the speech recognition manager can identify the syllables as reversed.

Regarding abbreviations, Chinese people may use abbreviations for a given POI similar to how English people may use "ASR" for "Automatic Speech Recognition." For example, 华东师范大学附属中学 (High School Associated with The East China Normal University) Pinyin: Hua Dong Shi Fan Da Xue Fu Shu Zhong Xue, can be abbreviated as 华师大附中 Pinyin: Hua Shi Da Fu Zhong. During the Dynamic Programming Match, the speech recognition manager finds all the Chinese Characters of a first sentence that are contained in a second sentence with the correct order.

The dynamic programming match can also identify synonyms. For example, people may say some POI with the synonyms, e.g. 阳城酒楼 (YangCheng Restaurant) is similar to 阳城酒店 (YangCheng Hotel), while 香格里拉酒店 (Shangri-La Hotel) is similar to 香格里拉大酒店 (Shangri-La Hotel).

In step 129, the speech recognition manager can execute post processing. With the dynamic programming match resulting in scores and flags for N-best string, the speech recognition manager can sort sentences by score, and gather sentences flagged as "Reversed Words" or "Abbreviation." If no "Reversed Words" or "Abbreviation" sentences are found then the N-best result can move to the next step, which can be returning to FIG. 1.

Figure 6:
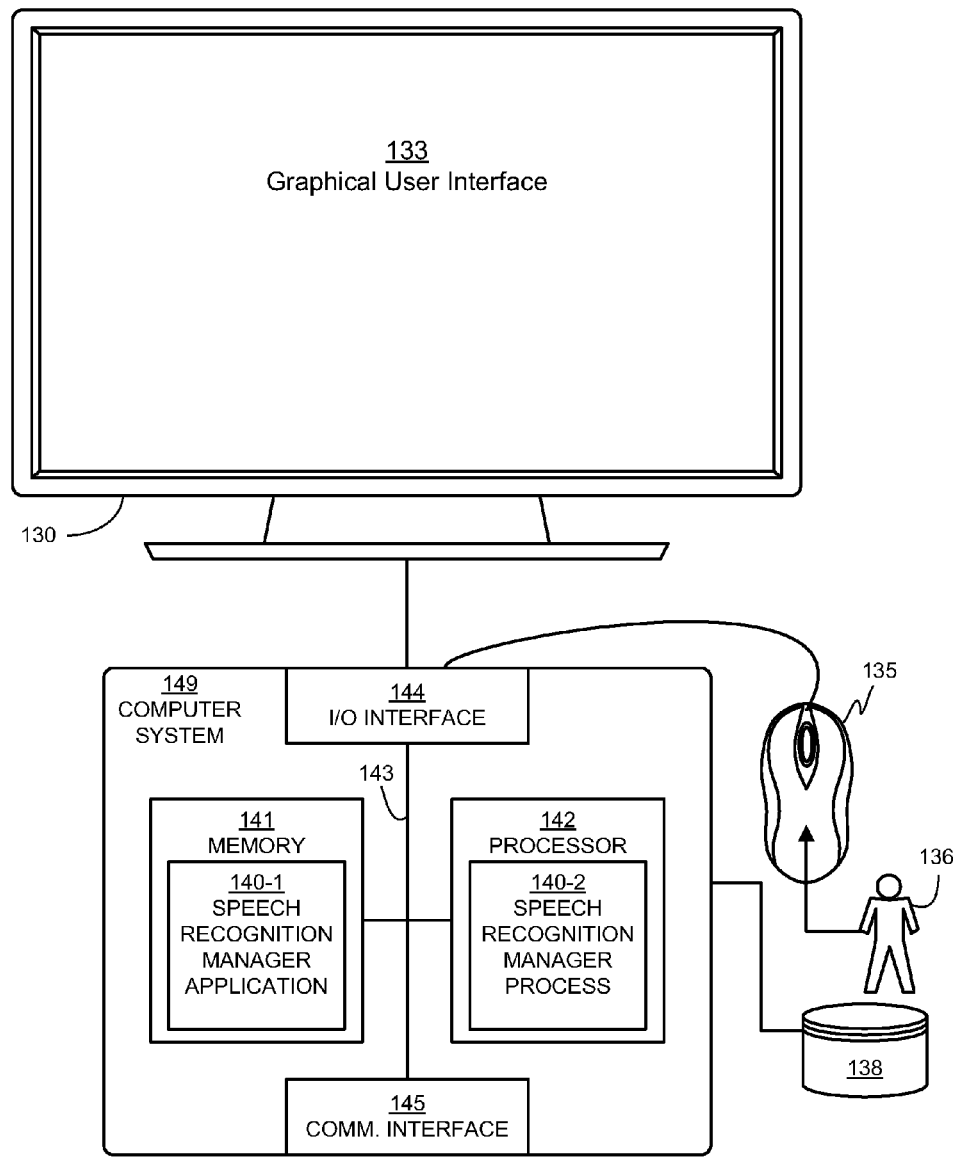
FIG. 6 is an example block diagram of a speech recognition manager operating in a computer/network environment according to embodiments herein.

FIG. 6 illustrates an example block diagram of a speech recognition manager 140 operating in a computer/network environment according to embodiments herein. Computer system 149 can function as a client device such as a car navigation system. Computer system 149 can connect to a remote server for processing assistance. Computer system hardware aspects of FIG. 6 will be described in more detail following a description of the flow charts.

Functionality associated with speech recognition manager 140 will now be discussed via flowcharts and diagrams in FIG. 3 through FIG. 5. For purposes of the following discussion, the speech recognition manager 140 or other appropriate entity performs steps in the flowcharts.

Figure 3:
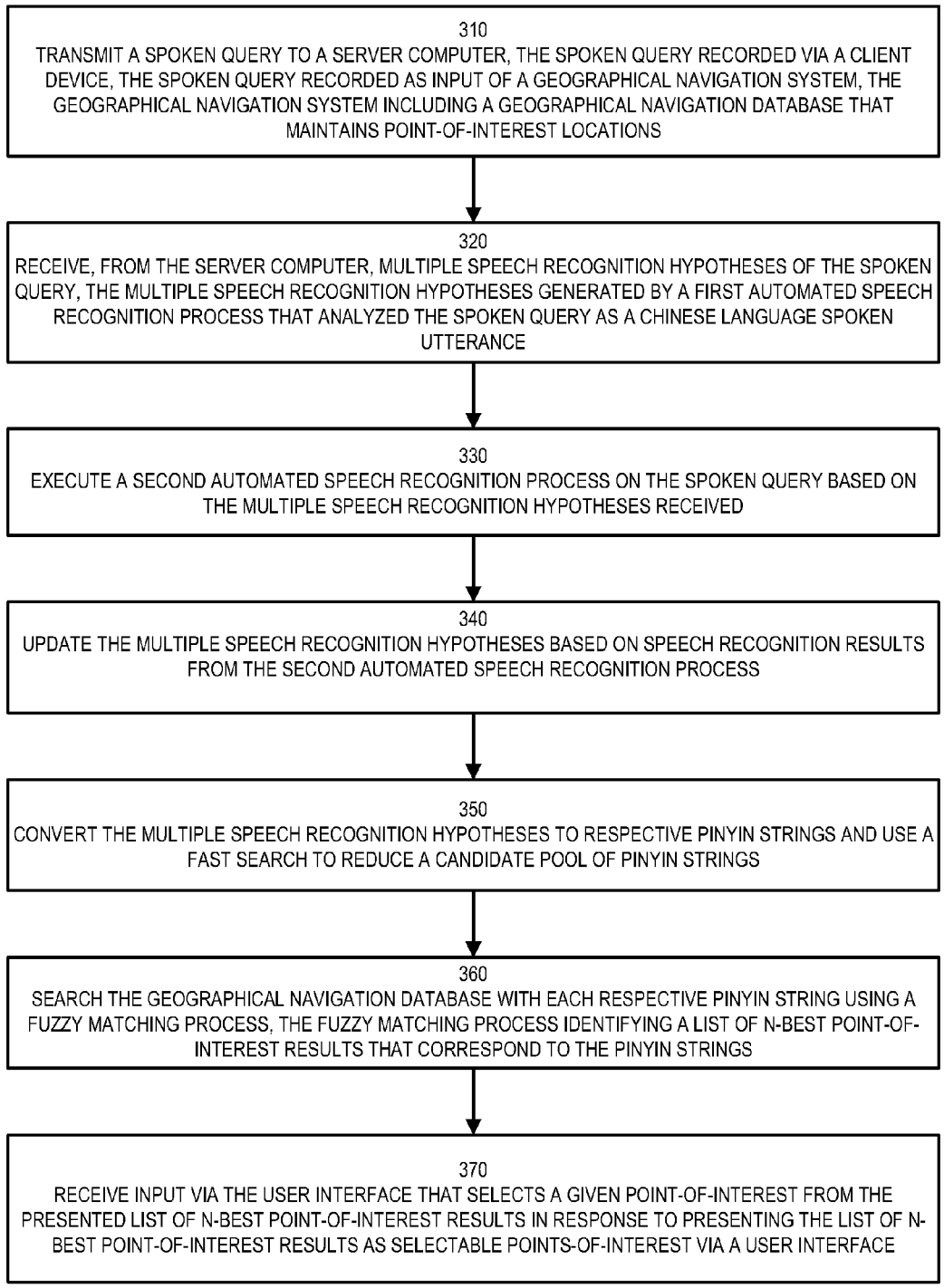
FIG. 3 is a flowchart illustrating an example of a process supporting open voice destination entry and recognition according to embodiments herein.

Now describing embodiments more specifically, FIG. 3 is a flow chart illustrating embodiments disclosed herein. In step 310, the speech recognition manager transmits a spoken query to a server computer. The spoken query is recorded via a client device such as a mobile phone, tablet computer, car system, etc. The spoken query is recorded as input of a geographical navigation system. The geographical navigation system includes a geographical navigation database that maintains point-of-interest locations for selecting destinations.

In step 320, the speech recognition manager receives, from the server computer, multiple speech recognition hypotheses of the spoken query. (If only one result is received, then this result can be presented immediately for user confirmation.) The multiple speech recognition hypotheses have been generated by a first automated speech recognition process that analyzed the spoken query as a Chinese language spoken utterance. For example, a speaker utters an open voice search for a particular point-of-interest speaking in Chinese Mandarin. Open search refers to accepting natural language input without requiring a spoken command format or being based on a particular grammar. While the textual results of a server-based recognition are not always accurate, a recognized pronunciation or sound is useful, even if it is associated with an incorrect character.

In step 330, the speech recognition manager executes a second automated speech recognition process on the spoken query based on the multiple speech recognition hypotheses received. The second automated speech recognition process can be executed at the client device. This can be based on sound information results received from the server, instead of character information.

In step 340, the speech recognition manager updates the multiple speech recognition hypotheses based on speech recognition results from the second automated speech recognition process.

In step 350, the speech recognition manager converts the multiple speech recognition hypotheses to respective Pinyin strings, and also executes a fast search that can reduce a relatively large candidate pool of several hundred thousand POIs to a few thousand.

In step 360, the speech recognition manager searches the geographical navigation database with each respective Pinyin string using a fuzzy matching process. The fuzzy matching process identifies a list of N-best point-of-interest results that correspond to the Pinyin strings.

In step 370, the speech recognition manager receives input via the user interface that selects a given point-of-interest from the presented list of N-best point-of-interest results in response to presenting the list of N-best point-of-interest results as selectable points-of-interest via a user interface. For example, a user views or hears the list of results and then speaks the correct POI result.

Figure 4:
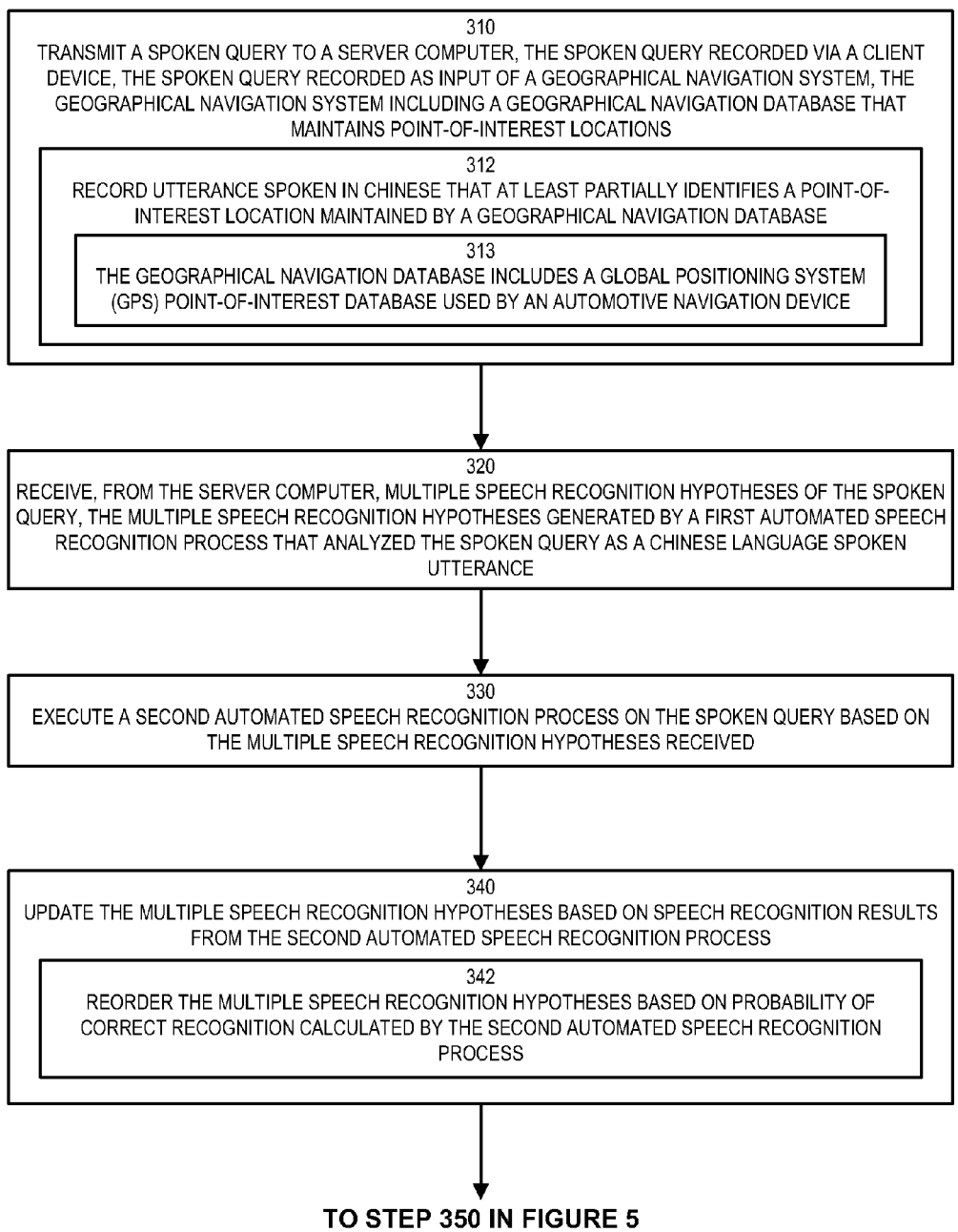
FIGS. 4-5 are a flowchart illustrating an example of a process supporting open voice destination entry and recognition according to embodiments herein.
Figure 5:
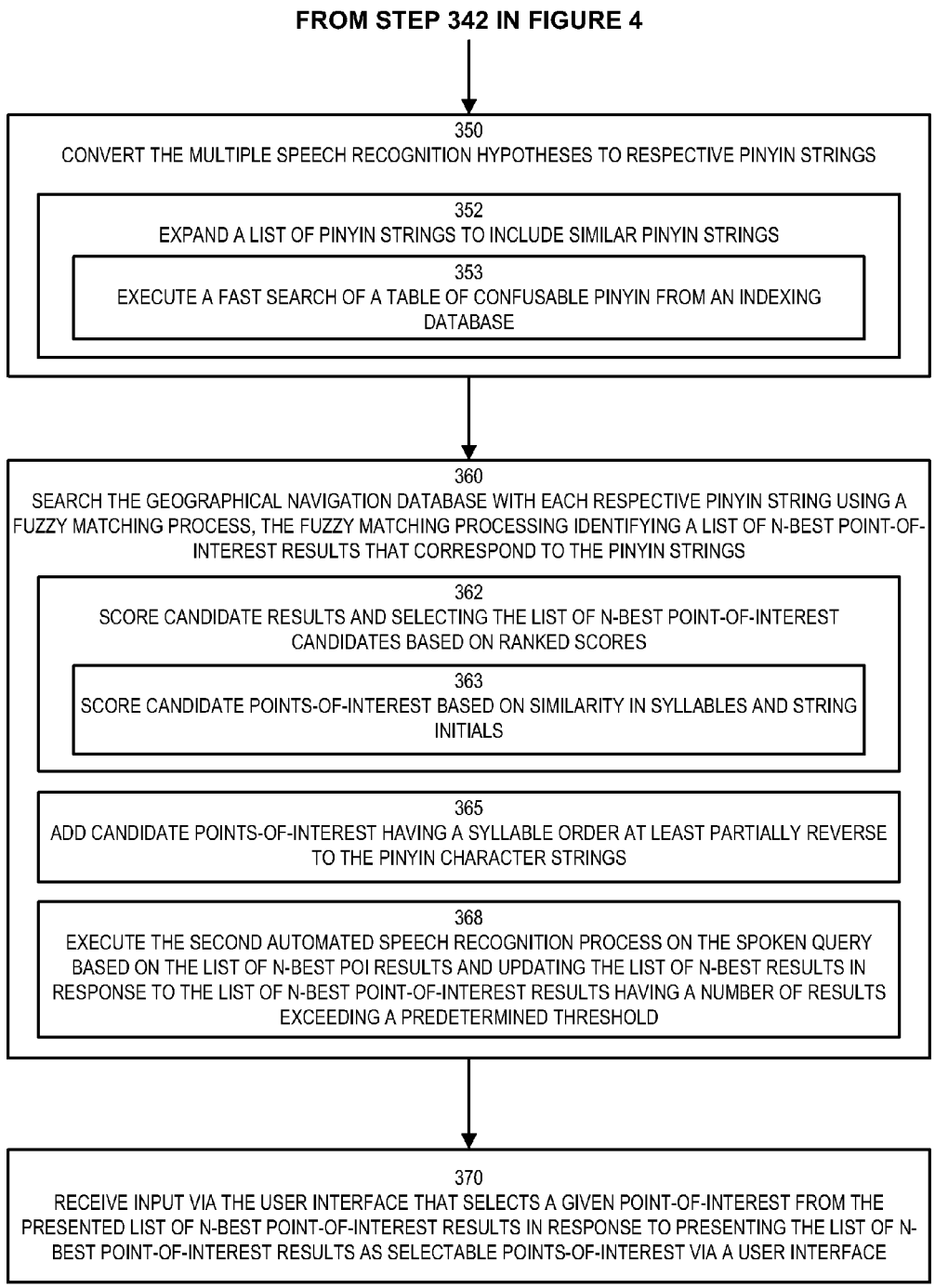

FIGS. 4-5 include a flow chart illustrating additional and/or alternative embodiments and optional functionality of the speech recognition manager 140 as disclosed herein.

In step 310, the speech recognition manager transmits a spoken query to a server computer. The spoken query is recorded via a client device. The spoken query is recorded as input of a geographical navigation system. The geographical navigation system includes a geographical navigation database that maintains point-of-interest locations for selecting destinations.

In step 312, the speech recognition manager records the utterance spoken in Chinese Mandarin that at least partially identifies a point-of-interest location maintained by a geographical navigation database. Thus, there can be additional wording in the query such as "I would like to drive to Nuance Shanghai." The system identifies the portion of the utterance that refers to the point-of-interest for speech recognition.

In step 313, the geographical navigation database includes a Global Positioning System (GPS) point-of-interest database used by an automotive navigation device.

In step 320, the speech recognition manager receives, from the server computer, multiple speech recognition hypotheses of the spoken query. The multiple speech recognition hypotheses have been generated by a first automated speech recognition process that analyzed the spoken query as a Chinese language spoken utterance.

In step 330, the speech recognition manager executes a second automated speech recognition process on the spoken query based on the multiple speech recognition hypotheses received. The second automated speech recognition process can be executed at the client device.

In step 340, the speech recognition manager updates the multiple speech recognition hypotheses based on speech recognition results from the second automated speech recognition process.

In step 342, the speech recognition manager reorders the multiple speech recognition hypotheses based on probability of correct recognition calculated by the second automated speech recognition process. That is, a list of N-best results can change based on speech recognition executed by the device based on the initial results.

In step 350, the speech recognition manager converts the multiple speech recognition hypotheses to respective Pinyin strings.

In step 352, the speech recognition manager expands a list of Pinyin strings to include similar Pinyin strings. In step 353, the speech recognition manager executes a fast search of a table of confusable Pinyin from an indexing database.

In step 360, the speech recognition manager searches the geographical navigation database with each respective Pinyin string using a fuzzy matching process. The fuzzy matching process identifies a list of N-best point-of-interest results that correspond to the Pinyin strings.

In step 362, the speech recognition manager scores candidate results and selects the list of N-best point-of-interest candidates based on ranked scores.

In step 363, the speech recognition manager scores candidate points-of-interest based on similarity in syllables and string initials.

In step 365, the speech recognition manager adds candidate points-of-interest having a syllable order at least partially reverse to the Pinyin character strings. Thus, the system can accommodate speakers who reverse an order of words in a point-of-interest as stored in a navigation device.

In step 368, the speech recognition manager executes the second automated speech recognition process on the spoken query based on the list of N-best POI results, and updates the list of N-best results in response to the list of N-best point-of-interest results having a number of results exceeding a predetermined threshold. Thus, if there are too many acceptable results, then these can be narrowed further.

In step 370, the speech recognition manager receives input via the user interface that selects a given point-of-interest from the presented list of N-best point-of-interest results in response to presenting the list of N-best point-of-interest results as selectable points-of-interest via a user interface.

In another embodiment, a method for voice destination entry includes transmitting a spoken query to a server computer. The spoken query is recorded via a client device. The spoken query is recorded as input of a database that maintains items of interest. Items of interest could be geographical locations, songs, videos, books, or other information. By way of a non-limiting example, a user may speak: "I would like to listen to jazz music" or name a particular song. The client device receives, from the server computer, multiple speech recognition hypotheses of the spoken query. The multiple speech recognition hypotheses are generated by a first automated speech recognition process that analyzes the spoken query as a Chinese language spoken utterance or other language spoken utterance. The speech recognition manager converts the multiple speech recognition hypotheses to respective Pinyin strings or transcription system that converts one language to another language representation. The speech recognition manager searches the database with each respective Pinyin string using a fuzzy matching process. The fuzzy matching process identifies a list of N-best item of interest results that correspond to the Pinyin strings. In response to presenting the list of N-best item of interest results as selectable items of interest via a user interface, the speech recognition manager receives input via the user interface that selects a specific item of interest from the presented list of N-best item of interest results.

The speech recognition manager can also execute a second automated speech recognition process on the spoken query based on the multiple speech recognition hypotheses received, and update the multiple speech recognition hypotheses based on speech recognition results from the second automated speech recognition process. Converting the multiple speech recognition hypotheses to respective Pinyin strings or other transcription strings can includes expanding the list to include similar Pinyin strings. Using the fuzzy matching process can include scoring candidate results and selecting the list of N-best item of interest candidates based on ranked scores, as well as adding candidate items of interest having a syllable order at least partially reverse to the Pinyin character strings.

Continuing with FIG. 6, the following discussion provides a basic embodiment indicating how to carry out functionality associated with the speech recognition manager 140 as discussed above. It should be noted, however, that the actual configuration for carrying out the speech recognition manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the speech recognition manager 140 of computer system 149 to communicate over a network and, if necessary, retrieve any data required to create views, process content, communicate with a user, etc. according to embodiments herein.

As shown, memory system 141 is encoded with speech recognition manager 140-1 that supports functionality as discussed above and as discussed further below. Speech recognition manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the speech recognition manager 140-1. Execution of the speech recognition manager 140-1 produces processing functionality in speech recognition manager process 140-2. In other words, the speech recognition manager process 140-2 represents one or more portions of the speech recognition manager 140 performing within or upon the processor 142 in the computer system 149.

It should be noted that, in addition to the speech recognition manager process 140-2 that carries out method operations as discussed herein, other embodiments herein include the speech recognition manager 140-1 itself (i.e., the unexecuted or non-performing logic instructions and/or data). The speech recognition manager 140-1 may be stored on a non-transitory, tangible computer-readable storage medium including computer readable storage media such as floppy disk, hard disk, optical medium, etc. According to other embodiments, the speech recognition manager 140-1 can also be stored in a memory type system such as in firmware, read only memory (ROM), or, as in this example, as executable code within the memory system 141.

In addition to these embodiments, it should also be noted that other embodiments herein include the execution of the speech recognition manager 140-1 in processor 142 as the speech recognition manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention is not intended to be limiting. Rather, any limitations to embodiments of the invention are presented in the following claims.

The invention claimed is:

1. A computer-implemented method for speech recognition, the computer-implemented method comprising:
    transmitting a spoken query to a server computer, the spoken query recorded via a client device, the spoken query recorded as input of a geographical navigation system, the geographical navigation system including a geographical navigation database that maintains point-of-interest locations;
    receiving, from the server computer, multiple speech recognition hypotheses of the spoken query, the multiple speech recognition hypotheses generated by a first automated speech recognition process that analyzed the spoken query as a Chinese language spoken utterance;
    executing a second automated speech recognition process on the spoken query based on the multiple speech recognition hypotheses received;
    updating the multiple speech recognition hypotheses based on speech recognition results from the second automated speech recognition process;
    converting the multiple speech recognition hypotheses to respective Pinyin strings;
    searching the geographical navigation database with each respective Pinyin string using a fuzzy matching process, the fuzzy matching process identifying a list of N-best point-of-interest results that correspond to the Pinyin strings; and
    in response to presenting the list of N-best point-of-interest results as selectable points-of-interest via a user interface, receiving input via the user interface that selects a given point-of-interest from the presented list of N-best point-of-interest results.

2. The computer-implemented method of claim 1, wherein converting the multiple speech recognition hypotheses to respective Pinyin strings includes expanding a list of Pinyin strings to include similar Pinyin strings.

3. The computer-implemented method of claim 2, wherein expanding the list of Pinyin strings to include similar Pinyin strings includes executing a fast search of a table of confusable Pinyin from an indexing database.

4. The computer-implemented method of claim 1, further comprising:
    in response to the list of N-best point-of-interest results having a number of results exceeding a predetermined threshold, executing the second automated speech recognition process on the spoken query based on the list of N-best POI results and updating the list of N-best results.

5. The computer-implemented method of claim 1, wherein using the fuzzy matching process includes scoring candidate results and selecting the list of N-best point-of-interest candidates based on ranked scores.

6. The computer-implemented method of claim 5, wherein scoring candidate results includes scoring candidate points-of-interest based on similarity in syllables and string initials.

7. The computer-implemented method of claim 1, wherein using the fuzzy matching process includes adding candidate points-of-interest having a syllable order at least partially reverse to the Pinyin character strings.

8. The computer-implemented method of claim 1, wherein the spoken query recorded by the client device includes a recorded utterance spoken in Chinese that at least partially identifies a point-of-interest location maintained by a geographical navigation database.

9. The computer-implemented method of claim 8, wherein the geographical navigation database includes a Global Positioning System (GPS) point-of-interest database used by an automotive navigation device.

10. The computer-implemented method of claim 1, wherein updating the multiple speech recognition hypotheses includes reordering the multiple speech recognition hypotheses based on probability of correct recognition calculated by the second automated speech recognition process.

11. A computer system for automatic speech recognition, the computer system comprising:
a processor; and
a memory coupled to the processor, the memory storing instructions that, when executed by the processor, cause the system to perform the operations of:
receiving a spoken query at a server computer, the spoken query recorded via a client device, the spoken query recorded as input of a geographical navigation system, the geographical navigation system including a geographical navigation database that maintains point-of-interest locations;
executing, via the server computer, a first automated speech recognition process of the spoken query, the first automated speech recognition process generating multiple speech recognition hypotheses of the spoken query, the first automated speech recognition processes analyzing the spoken utterance as a Chinese language spoken query;
transmitting the multiple speech recognition hypotheses of the spoken query;
executing, via the client device, a second automated speech recognition process on the spoken query based on the multiple speech recognition hypotheses received;
updating the multiple speech recognition hypotheses based on speech recognition results from the second automated speech recognition process;
converting the multiple speech recognition hypotheses to respective Pinyin strings;
searching the geographical navigation database with each respective Pinyin string using a fuzzy matching process, the fuzzy matching processing identifying a list of N-best point-of-interest results that correspond to the Pinyin strings; and
in response to presenting the list of N-best point-of-interest results as selectable points-of-interest via a user interface, receiving input via the user interface that selects a given point-of-interest from the presented list of N-best point-of-interest results.

12. The computer system of claim 11, wherein converting the multiple speech recognition hypotheses to respective Pinyin strings includes expanding a list of Pinyin strings to include similar Pinyin strings retrieved from a table of confusable Pinyin from a training database.

13. The computer system of claim 11, the memory storing further instructions that, when executed by the processor, cause the system to perform the operation of:
in response to the list of N-best point-of-interest results having a number of results exceeding a predetermined threshold, executing the second automated speech recognition process on the spoken query based on the list of N-best POI results and updating the list of N-best results.

14. The computer system of claim 11, wherein using the fuzzy matching process includes scoring candidate results and selecting the list of N-best point-of-interest candidates based on ranked scores.

15. The computer system of claim 11, wherein using the fuzzy matching process includes adding candidate points-of-interest having a syllable order at least partially reverse to the Pinyin character strings.

16. The computer system of claim 11, wherein the spoken query recorded by the client device includes a recorded utterance spoken in Chinese that at least partially identifies a point-of-interest location maintained by a Global Positioning System (GPS) point-of-interest database used by an automotive navigation device.

17. The computer system of claim 11, wherein updating the multiple speech recognition hypotheses includes reordering the multiple speech recognition hypotheses based on probability of correct recognition calculated by the second automated speech recognition process.

18. A computer-implemented method for speech recognition, the computer-implemented method comprising:
transmitting a spoken query to a server computer, the spoken query recorded via a client device, the spoken query recorded as input of a database that maintains items of interest;
receiving, from the server computer, multiple speech recognition hypotheses of the spoken query, the multiple speech recognition hypotheses generated by a first automated speech recognition process that analyzed the spoken query as a Chinese language spoken utterance;
converting the multiple speech recognition hypotheses to respective Pinyin strings;
searching the database with each respective Pinyin string using a fuzzy matching process, the fuzzy matching process identifying a list of N-best item of interest results that correspond to the Pinyin strings; and
in response to presenting the list of N-best item of interest results as selectable items of interest via a user interface, receiving input via the user interface that selects a specific item of interest from the presented list of N-best item of interest results.

19. The computer-implemented method of claim 18, further comprising:
executing a second automated speech recognition process on the spoken query based on the multiple speech recognition hypotheses received; and
updating the multiple speech recognition hypotheses based on speech recognition results from the second automated speech recognition process.

20. The computer-implemented method of claim 18, wherein converting the multiple speech recognition hypotheses to respective Pinyin strings includes expanding a list of Pinyin strings to include similar Pinyin strings;
wherein using the fuzzy matching process includes scoring candidate results and selecting the list of N-best item of interest candidates based on ranked scores; and
wherein using the fuzzy matching process includes adding candidate items of interest having a syllable order at least partially reverse to the Pinyin character strings.

* * * * *